United States Patent
Murakami et al.

(10) Patent No.: US 8,253,850 B2
(45) Date of Patent: Aug. 28, 2012

(54) IMAGING APPARATUS AND PROGRAM THEREOF

(75) Inventors: Tomohiko Murakami, Kunitachi (JP); Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/223,791

(22) Filed: Sep. 1, 2011

(65) Prior Publication Data

US 2011/0310292 A1  Dec. 22, 2011

Related U.S. Application Data

(62) Division of application No. 12/354,112, filed on Jan. 15, 2009, now Pat. No. 8,035,729.

(30) Foreign Application Priority Data

Jan. 18, 2008 (JP) .................................. 2008-009552

(51) Int. Cl.
*H04N 5/238* (2006.01)
(52) U.S. Cl. ....................................... 348/364; 396/242
(58) Field of Classification Search .................. 396/242; 348/364
See application file for complete search history.

(56) References Cited

U.S. PATENT DOCUMENTS

| | | | |
|---|---|---|---|
| 5,576,788 A | 11/1996 | Miyazawa et al. | |
| 2002/0051634 A1 | 5/2002 | Sato | |
| 2005/0062875 A1* | 3/2005 | Ojima | 348/362 |
| 2005/0200744 A1* | 9/2005 | Kobayashi | 348/362 |
| 2006/0177207 A1 | 8/2006 | Bang et al. | |
| 2007/0127903 A1* | 6/2007 | Nomura et al. | 396/52 |

FOREIGN PATENT DOCUMENTS

| | | |
|---|---|---|
| JP | 2003-092701 A | 3/2003 |
| JP | 2006-060409 A | 3/2006 |
| JP | 2007-166088 A | 6/2007 |
| JP | 2007-267309 A | 10/2007 |

OTHER PUBLICATIONS

Translation of JP Publication No. 2005-323144; Title: Electronic Camera; Inventor: Noguchi, Hideo; Publication Date: Nov. 17, 2005.*
Translation of JP Publication No. 2006-060409; Title: Imaging Apparatus and Control Method Thereof; Inventor: Ueyama, Teruhiko; Publication Date: Mar. 2, 2006.*
Japanese Office Action dated Dec. 16, 2009, issued in counterpart Japanese Application No. 2008-009552, and English translation thereof.

* cited by examiner

*Primary Examiner* — Christopher Mahoney
*Assistant Examiner* — Fang-Chi Chang
(74) *Attorney, Agent, or Firm* — Holtz, Holtz, Goodman & Chick, PC (57) ABSTRACT

In a digital camera, in an automatic shooting stand-by state, when it is judged that an automatic shooting condition has not been satisfied, it is judged whether or not to issue an AE re-processing command (that is, it is judged whether or not the current shooting condition is similar to a condition where the automatic shooting condition is satisfied). When it is judged to issue the AE re-processing command, exposure tracking in an aperture-priority mode is performed, and shooting exposure conditions excluding the aperture value for still-image shooting in the aperture-priority mode are determined. Then, storage is updated. When it is judged that an automatic shooting condition has been satisfied, record processing for still-image shooting is performed with the updated shooting exposure conditions without changing the aperture value.

14 Claims, 4 Drawing Sheets

IMAGING APPARATUS AND PROGRAM THEREOF

CROSS-REFERENCE TO RELATED APPLICATIONS

This is a Divisional Application of U.S. application Ser. No. 12/354,112, filed Jan. 15, 2009 now U.S. Pat. No. 8,035,729, which is based upon and claims the benefit of priority from prior Japanese Patent Application No. 2008-009552, filed Jan. 18, 2008, the entire contents of both of which are incorporated herein by reference.

BACKGROUND OF THE INVENTION

1. Field of the Invention

The present invention relates to an imaging apparatus and a program thereof. In particular, the present invention relates to an imaging apparatus providing an automatic recording function and a program thereof.

2. Description of the Related Art

A technology is known in which automatic recording is performed when the subject enters a predetermined condition. To actualize a technology such as this, there is a method in which imaging conditions (such as aperture value, shutter speed, and gain value) used during automatic shooting are calculated upon entering an automatic shooting stand-by state, and automatic shooting and recording is performed using the calculated imaging conditions to prevent time lag in automatic shooting timing caused by the calculation of imaging conditions used during automatic shooting and mechanical aperture operations (Japanese Patent Application Laid-Open (Kokai) Publication No. 2003-092701).

However, according to the above conventional technology (Japanese Patent Application Laid-Open (Kokai) Publication No. 2003-092701), when a prolonged time is taken to perform automatic recording after entering the automatic shooting stand-by state, the luminance of the subject may change. As a result, image data captured with correct exposure cannot be obtained.

SUMMARY OF THE INVENTION

The present invention has been conceived in light of the foregoing conventional issues, and is to provide an imaging apparatus and a program thereof that suppresses shooting time lag and obtain image data captured with correct exposure.

In accordance with one aspect of the present invention, there is provided an imaging device comprising: an image sensor; an automatic shooting control means for successively judging whether or not there is a condition which satisfies an automatic shooting condition and, when judged there is a condition which satisfies an automatic shooting condition, automatically records image data captured by the image sensor; and an automatic exposure control means for performing an automatic exposure adjustment in an aperture preferred mode, when initiating an automatic shooting condition judgment by the automatic shooting control means following an automatic exposure adjustment in a mode which is not the aperture preferred mode.

In accordance with another aspect of the present invention, there is provided a computer-readable storage medium having a program stored thereon that is executable by a computer included in an imaging apparatus to cause the computer to perform a process comprising: automatic shooting control processing for successively judging whether or not there is a condition which satisfies an automatic shooting condition and, when judged there is a condition which satisfies an automatic shooting condition, automatically records image data captured by an image sensor; and automatic exposure control processing for performing an automatic exposure adjustment in an aperture preferred mode between initiating an automatic shooting condition judgment by the automatic shooting control processing following an automatic exposure adjustment in a mode which is not the aperture preferred mode and being judged that there is a condition which satisfies an automatic shooting condition.

According to the present invention, image data captured with correct exposure can be obtained, while suppressing shooting time lag.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments in which an imaging apparatus is applied to a digital camera as an example shown in the accompanying drawings.

Embodiment

A. Configuration of the Digital Camera

Figure 1:
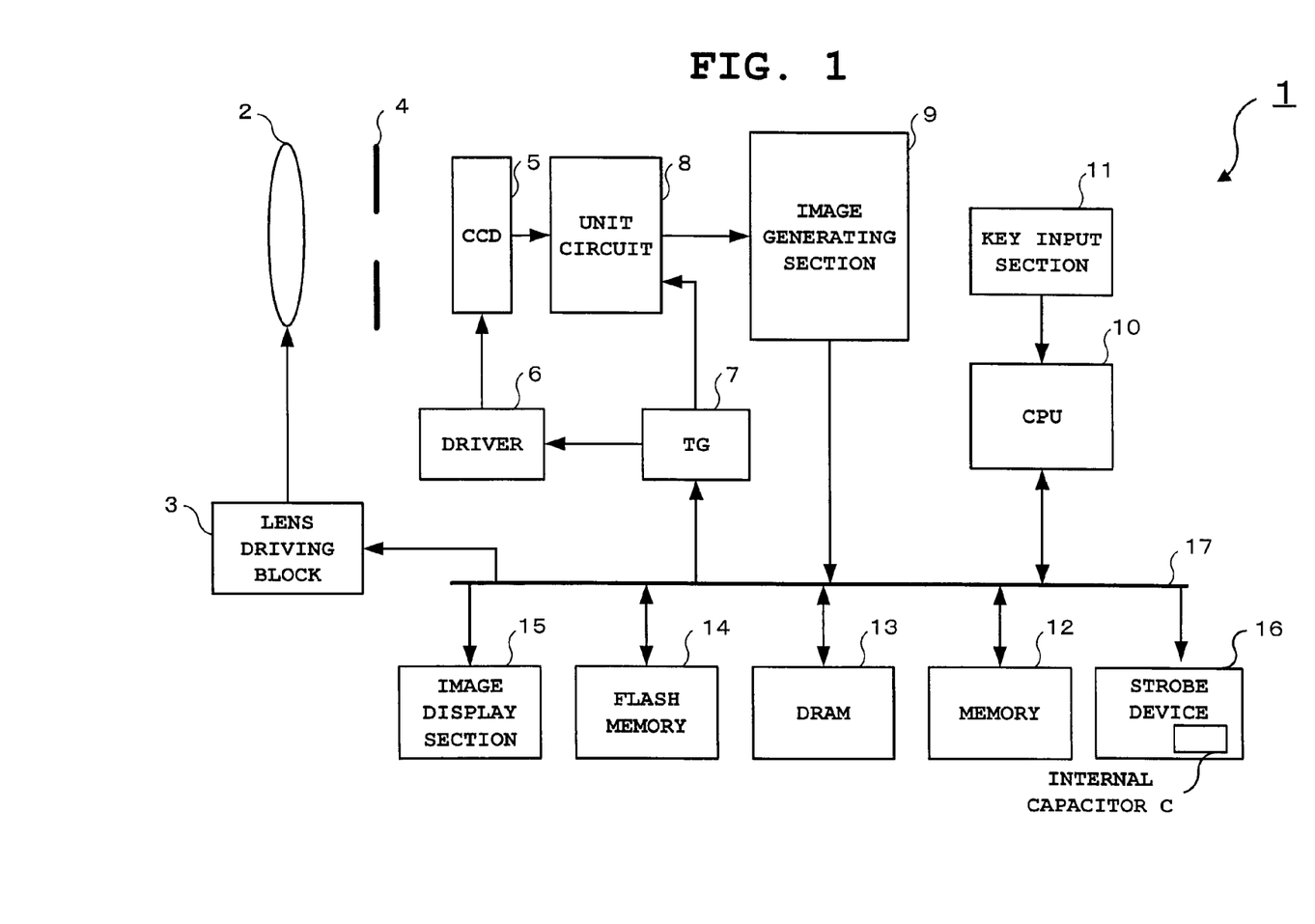
FIG. 1 is a block diagram of a digital camera 1 according to an embodiment of the present invention.

FIG. 1 is a block diagram showing an electric schematic of a digital camera 1 actualizing the imaging apparatus of the present invention.

The digital camera 1 includes an imaging lens 2, a lens driving block 3, an aperture 4, a charge-coupled device (CCD) 5, a driver 6, a timing generator (TG) 7, a unit circuit 8, an image generating section 9, a central processing unit (CPU) 10, a key input section 11, a memory 12, a dynamic random access memory (DRAM) 13, a flash memory 14, an image display section 15, a strobe device 16, and a bus 17.

The imaging lens 2 includes a focus lens and a zoom lens each of which includes a plurality of lens groups not shown, and is connected with the lens driving block 3. The lens driving block 3 includes a focus motor, a zoom motor, a focus motor driver and a zoom motor driver (not shown). The focus motor and the zoom motor respectively move the focus lens and the zoom lens in the optical axis direction. The focus motor driver and the zoom motor driver respectively drive the focus motor and the zoom motor to move the focus lens and the zoom lens in the optical axis direction, in adherence to control signals sent from the CPU 10.

The aperture 4 includes a driver circuit (not shown), and the driver circuit changes exposure by activating the aperture 4 in adherence to control signals sent from the CPU 10. The aperture refers to a mechanism that controls an amount of light irradiated to the CCD 5. The exposure is determined based on the aperture degree (aperture value) by the aperture 4, the shutter speed, and the gain value.

The CCD 5 is driven for scanning by the driver 6, and after photo-electrically converting the light intensity of the respective colors in the RGB value of a photographic subject image to an imaging signal at a constant cycle, outputs the imaging signal to the unit circuit 8. The operation timing of this driver 6 and unit circuit 8 are controlled by the CPU 10 via the TG 7. The CCD 5 has a function of an electronic shutter, and this electronic shutter is controlled by the CPU 10 via the driver 6 and the TG 7. The exposure duration varies depending on the shutter speed of the electronic shutter.

The TG 7 is connected to the unit circuit 8. The unit circuit 8 includes a correlated double sampling (CDS) circuit, an automatic gain control (AGC) circuit, and an analog-to-digital (A/D) converter. The CDS circuit performs correlated double sampling on an imaging signal outputted from the CCD 5 and holds the sampled imaging signal. The AGC circuit performs automatic gain control on the sampled imaging signal. The A/D converter converts the automatic-gain-controlled analog imaging signal to a digital signal. The imaging signal outputted from the CCD 5 is sent to the image generating section 9 as a digital signal, via the unit circuit 8.

The image generating section 9 performs processing such as γ correction processing, white balance processing and the like on image data sent from the unit circuit 8 and generates a luminosity color difference signal (YUV data). The generated luminosity color difference signal image data (YUV data) is stored in the DRAM 13 (buffer memory). In other words, the image generating section 9 performs image processing on image data outputted from the CCD 5.

The CPU 10 is a single-chip microcomputer for controlling each section of the digital camera 1, and has a function that performs imaging control on the CCD 5, record processing for compressing image data stored in the buffer memory and recording the compressed image data in the flash memory 14, and display processing for displaying image data stored in the buffer memory. The CPU 10 includes a clock circuit which clocks date and time.

In particular, the CPU 10 according to the embodiment has an automatic shooting control function and an automatic exposure control function the automatic shooting control function successively judges whether or not an automatic shooting condition (auto-shutter condition) has been satisfied, and automatically records image data captured by the image sensor when judged that an automatic shooting condition (auto-shutter condition) has been satisfied. The automatic exposure control function performs an automatic exposure adjustment by an aperture preferred mode when an automatic shooting condition judgment is initiated by the automatic shooting control means after performing an automatic exposure adjustment in a mode which is not the aperture preferred mode. In this aperture preferred mode, without changing an aperture value (aperture value is fixed), other exposure conditions (shutter speed and gain value) are automatically controlled so as to constitute an optimum exposure corresponding to the luminance of a subject. Although aperture values are fixed in this embodiment, the aperture values need not be fixed. Alternatively, the variable range or the variable frequency may be lessened without fixing the aperture values.

Thus, the CPU 10 actualizes the functions of an imaging control means, a first judgment means, an automatic shooting control means, a second judgment means, and an automatic exposure control means.

The key input section 11 includes a plurality of operation keys such as a shutter button enabling both half-depression and full-depression operations, namely a two-stage operation, a mode selection key, and an auto-shutter key, and outputs operation signals corresponding to a key operation performed by the user to the CPU 10.

The memory 12 stores a control program required for the CPU 10 to control each section of the digital camera 1 and necessary data, and the CPU 10 operates in accordance with this program.

The memory 12 also stores a program chart for through-image display in P-mode, a program chart for through-image display in A-mode, a program chart for shooting in P-mode, and a program chart for shooting in A-mode.

A program chart in P-mode is used to determine exposure conditions and shooting exposure conditions based on a Light Value (LV) value. The exposure conditions and shooting exposure conditions include an aperture value, a shutter speed, and a gain value. The LV value indicates the luminance of a subject. The program chart in A-mode is used to determine exposure conditions and shooting exposure conditions excluding aperture values based on the luminance of a subject and a predetermined aperture value. In other words, the program chart in A-mode is used to determine exposure conditions and shooting exposure conditions excluding fixed aperture values (aperture preferred mode). In the aperture preferred mode, aperture values are fixed and shooting exposure conditions excluding aperture values are determined.

The program chart for through-image display is used to determine exposure conditions during a through-image display, and the program chart for shooting is used to determine shooting exposure conditions for still-image shooting. For convenience, "exposure conditions" herein refer to exposure conditions under which a through-image is captured, and "shooting exposure conditions" herein refer to exposure conditions under which a still-image is shot.

Figure 2A:
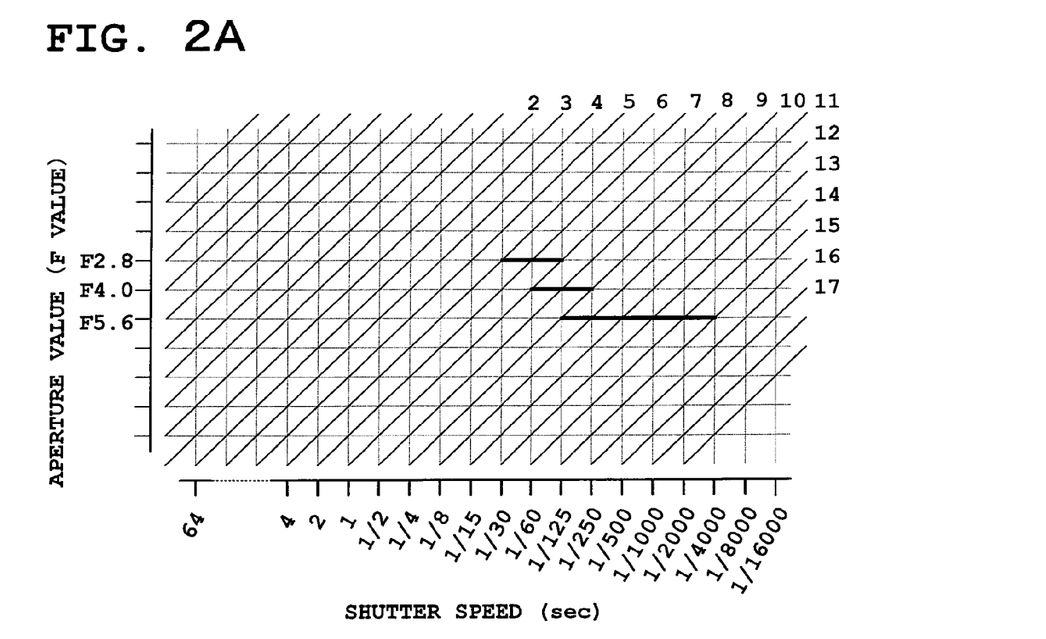
FIG. 2A is a diagram showing an example of a program chart for shooting in P-mode.
Figure 2B:
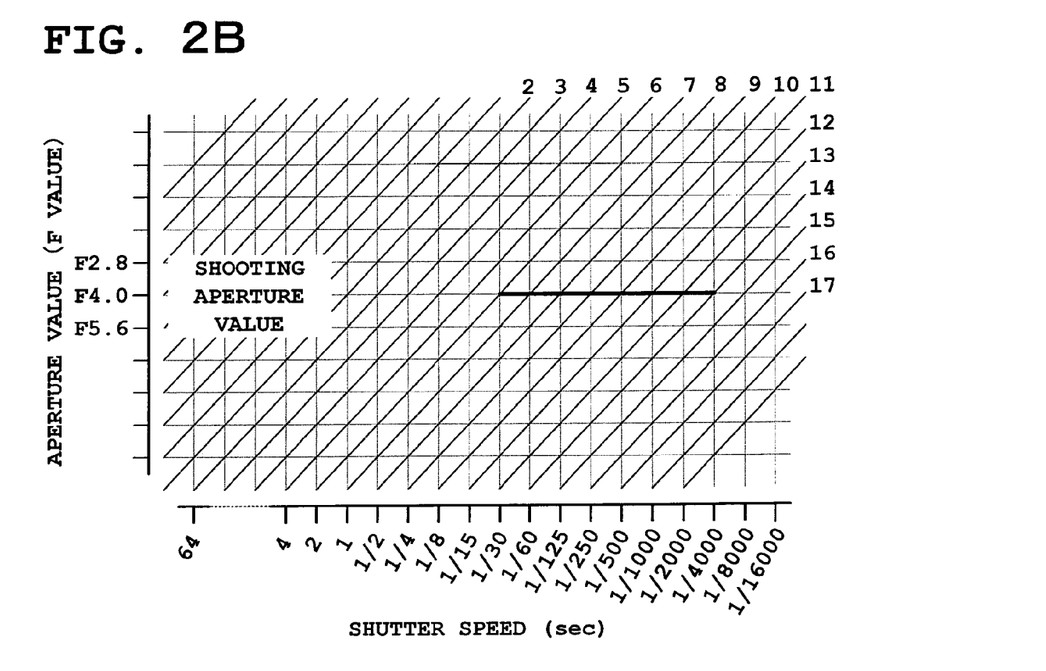
FIG. 2B is a diagram showing an example of a program chart for shooting in A-mode.

FIG. 2A and FIG. 2B show examples of the program charts for shooting. In particular, FIG. 2A shows a program chart for shooting in P-mode, and FIG. 2B shows a program chart for shooting in A-mode.

The program charts shown in FIG. 2A and FIG. 2B only show aperture values and shutter speeds based on the LV value of the luminance of a subject. However, separate program charts recording gain values based on the shutter speed and the aperture value are also included.

Also, although not specifically shown in the drawing, the program chart for through-image display is, for example, a program chart in which hysteresis is added to the change of an aperture value as compared with the program chart for shooting.

That is, since an aperture value changes gradually, by changing the changing point of the aperture value for the case where the LV value of the luminance of a subject changes from the darker side to the brighter side, and by changing the changing point of the aperture value for the case where the LV value of the luminance of a subject changes from the brighter side to the darker side, the changing timing of the aperture value is delayed. Thereby, in a through-image display in which consecutive capturing and display are performed which is different from still-image shooting in which single shot capturing is performed, even under a shooting environment where the luminance changes frequently, the frequency of the change of the aperture value can be reduced, and also flickering in the display screen and operation noises from the aperture can be reduced.

The DRAM 13 is used as a buffer memory for temporarily storing image data captured by the CCD 5 and sent to the CPU 10, and also used as a working memory of the CPU 10.

The flash memory 14 is a storage medium for storing image data captured by the CCD 5 and the like.

The image display section 15 includes a color liquid crystal display (LCD) and a driver circuit thereof. In a still-image shooting mode, the image display section 15 displays a subject shot by the CCD 5 as a through-image until the still-image is shot. When a recorded image is reproduced, the image display section 15 reads out the recorded image from the flash memory 14 and displays an expanded version of the recorded image.

The strobe device 16 includes an internal capacitor C, a charging circuit (not shown), a light-emitting circuit (not shown) including a xenon tube, a charging voltage detection circuit (not shown) for the capacitor C, and the like. The charging circuit charges the internal capacitor C. The light-emitting circuit provides the xenon tube serving as a light source with load of the internal capacitor C, thereby emitting a flash of light. The CPU 10 controls the start of charging, light emission, and light emission duration of the strobe device 16, and the strobe device 16 emits light and the like under the control of the CPU 10. The charging voltage detection circuit in the strobe device 16 sends a detected charging voltage to the CPU 10.

B. Operations of the Digital Camera 1

The operation of the digital camera 1 according to the embodiment will hereinafter be described with reference to flowcharts of FIGS. 3 and 4.

When the still-image shooting mode is set by the user's operation of the mode selection key in the key input section 11, the CPU 10 controls the CCD 5 to start capturing a subject at a predetermined frame rate, and starts a so-called through-image display (sometimes referred to as a monitor display or a live view). In the through-image display, the DRAM 13 (buffer memory) stores frame image data of luminosity color difference signals sequentially captured by the CCD 5 and generated by the image generating section 9, and the image display section 15 displays images based on the sequentially stored frame image data.

Next, the CPU 10 starts exposure tracking using the program chart for through-image display in P-mode (Step S2). In other words, the CPU 10 repeats an operation in which the LV value of the luminance of the subject is calculated based on the luminosity component of the most recently captured frame image data, and after determining exposure conditions (aperture value, shutter speed, and gain value) under which the next image is shot using the calculated LV value and the program chart for through-image display in P-mode, capturing is performed with the determined exposure conditions.

Next, the CPU 10 judges whether or not the operation of the auto-shutter key has been performed by the user (Step S3). This judgment is made based on whether or not an operational signal corresponding to the operation of the auto-shutter key has been sent from the key input section 11.

When judged at Step S3 that the auto-shutter key has been operated, the CPU 10 judges whether or not an auto-shutter mode is currently ON (Step S4).

When judged at Step S4 that the auto-shutter mode is not currently ON, the CPU 10 switches the auto-shutter mode from OFF to ON (Step S5), and proceeds to Step S7. When judged at Step S4 that the auto-shutter mode is currently ON, the CPU 10 switches the auto-shutter mode from ON to OFF (Step S6) and proceeds to Step S7. In other words, every time the user operates the auto-shutter key, the auto-shutter mode switches between ON and OFF.

When the auto-shutter mode is ON, a still-image is automatically shot upon entering a certain shooting condition. When the auto-shutter mode is OFF, a still-image is shot by the user's operation of the shutter button.

On the other hand, when judged at Step S3 that the user has not operated the auto-shutter key, the CPU 10 proceeds directly to Step S7.

At Step S7, the CPU 10 judges whether or not the half-depression of the shutter button has been performed by the user. This judgment is made based on whether or not an operational signal corresponding to the half-depression of the shutter button has been sent from the key input section 11.

When judged at Step S7 that the half-depression of the shutter button has not been performed, the CPU 10 returns to Step S3. When judged at Step S7 that the half-depression has been performed, the CPU 10 determines shooting exposure conditions (aperture value, shutter speed, and gain value) using the program chart for shooting in P-mode (Step S8).

The shooting exposure conditions are determined by calculating the LV value of the luminance of the subject based on the luminosity component of the frame image data most recently captured, and by using the calculated LV value and the program chart for shooting in P-mode.

Next, the CPU 10 sets the aperture value to the determined aperture value (Step S9). As a result of this setting of the aperture value, the aperture 4 is operated and changes the degree of contraction so as to constitute the determined aperture value.

Next, the CPU 10 stores the shooting exposure conditions excluding the determined aperture value in the shooting exposure condition storage area of the buffer memory (Step S10).

Next, the CPU 10 judges whether or not the auto-shutter mode is currently ON (Step S11).

When judged at Step S11 that the automatic shutter mode is not currently ON or, in other words, OFF, the CPU 10 enters an shooting stand-by state. Then, the CPU 10 determines exposure conditions excluding the aperture value using the program chart for through-image display in P-mode and the set aperture value (Step S12). To achieve the same amount of exposure as that achieved by the shooting exposure conditions determined at Step S8, the CPU 10 determines exposure conditions excluding the aperture value set at Step S9 (aperture value determined at Step S8) using the program chart for through-image display in P-mode. In other words, the CPU 10 determines a shutter speed and a gain value for through-image display without changing the set aperture value to achieve the amount of exposure achieved by the shooting exposure conditions determined at Step S8. As a result of this determination of the exposure conditions excluding the aperture value, the subsequent through-images will be captured with the aperture value set at Step S9 and under the exposure conditions excluding the set aperture value.

Next, the CPU 10 judges whether or not the full-depression of the shutter button has been performed by the user (Step S13). This judgment is made based on whether or not an operational signal corresponding to the full-depression of the shutter button has been sent from the key input section 11.

When judged at Step S13 that the full-depression of the shutter button has not been performed, the CPU 10 remains at Step S13 until the full-depression is performed. When judged at Step S13 that the full-depression of the shutter button has been performed, the CPU 10 performs still-image shooting processing based on the shooting exposure conditions excluding the aperture value stored at Step S10, without changing the aperture value set at Step S9 (without operating the aperture 4). The obtained still-image data is compressed and recorded in the flash memory 14 (Step S14).

On the other hand, when judged at Step S11 that the autoshutter mode is ON, the CPU 10 enters the automatic shooting stand-by state. Then, the CPU 10 proceeds to Step S21 in FIG. 4 and judges whether or not a strobe mode is currently set to OFF. This strobe mode can be set by a setting mode or the like.

When judged at Step S21 that the strobe mode is not OFF or, in other words, is ON or set to auto, the CPU 10 starts processing for charging the internal capacitor C of the strobe device 16 (Step S22).

Next, the CPU 10 judges whether or not the charging of the internal capacitor C is completed (Step S23). The CPU 10 judges that the charging is completed when a voltage sent from the charging voltage detection circuit of the strobe device 16 reaches a predetermined voltage.

When judged at Step S23 that the charging of the internal capacitor C is not completed, the CPU 10 remains at Step S23 until the charging is completed. When judged that the charging of the internal capacitor C is completed, the CPU 10 stops the charging (Step S24) and proceeds to Step S25.

On the other hand, when judged at Step S21 that the strobe mode is OFF, the CPU 10 proceeds directly to Step S25.

At Step S25, the CPU 10 determines exposure conditions excluding the aperture value using the program chart for through-image display in P-mode and the set aperture value (Step S25). To achieve the same amount of exposure as that achieved by the shooting exposure conditions determined at Step S8, the CPU 10 determines exposure conditions excluding the aperture value set at Step S9 (aperture value determined at Step S8) using the program chart for through-image display in P-mode. In other words, the CPU 10 determines a shutter speed and a gain value for through-image display without changing the set aperture value to achieve the amount of exposure achieved by the shooting exposure conditions determined at Step S8. As a result of this determination of the exposure conditions excluding the aperture value, the subsequent through-images will be captured with the aperture value set at Step S9 and under the exposure conditions excluding the set aperture value.

Next, the CPU 10 judges whether or not captured frame image data has satisfied an automatic shooting condition (auto-shutter condition) (Step S26).

Here, an explanation about satisfying an automatic shooting condition will be briefly described.

When an automatic shooting is a case of blurrless automatic shooting, for example, automatic shooting will be performed if a blurred picture image is less than a predetermined value. As a result the CPU 10 judges that an automatic shooting condition has been satisfied if a blurred picture image (motion vector) is less than a predetermined value.

Also, when an automatic shooting is an automatic follow shot, automatic shooting will be performed when the image blurring of the main subject of the follow shot is less than a predetermined value. As a result, the CPU 10 judges that an automatic shooting condition has been satisfied if the detected image blurring (motion vector) of a main subject is less than a predetermined value.

Furthermore, when an automatic shooting is an automatic smile shooting, automatic shooting will be performed when an image area that matches predetermined smile characteristic data by a predetermined value or more is detected. As a result, the CPU 10 judges that an automatic shooting condition has been satisfied if an image area that matches predetermined smile characteristics data by a predetermined value or more is detected.

Although blurrless automatic shooting, automatic follow shot, and automatic smile shooting are described, other automatic shooting operations may be performed.

When judged at Step S26 that an automatic shooting condition has not been satisfied, the CPU 10 judges whether or not to issue a AE re-processing command (Step S27). Here, this AE re-processing command is issued when captured frame image data is in a condition similar to a condition where an automatic shooting condition is satisfied. In other words, the command is issued when an automatic shooting condition is satisfied within a predetermined range. As a result, the command is issued when an automatic shooting condition is almost satisfied.

In a condition similar to a condition which satisfies an automatic shooting condition, for example, in the case of blurrless automatic shooting, the AE re-processing command is issued when the image blurring of an image is greater than a predetermined value but smaller than a threshold value that is slightly greater than the predetermined value. In an automatic follow shot, the AE re-processing command is issued when the image blurring of the main subject is greater than a predetermined value but smaller than a threshold value that is slightly greater than the predetermined value. In automatic smile shooting, even though an image area that matches predetermined smile characteristic data by a predetermined value or more is not detected, the AE re-processing command is issued when an image area that matches predetermined smile characteristic data by a threshold value that is slightly less than the predetermined value or more is detected.

This AE re-processing command is continuously issued while the current shooting condition is similar to a condition where an automatic shooting condition is satisfied.

When judged at Step S27 that the AE re-processing command is not issued, the CPU 10 returns directly to Step S26. When judged at Step S27 that the AE re-processing command is issued, the CPU 10 sets the digital camera 1 in the aperture preferred mode and determines exposure conditions excluding the aperture value using the program chart for through-image display in A-mode, the current LV value, and the aperture value set at Step S9 in FIG. 3 (Step S28). This current LV value is calculated based on the luminosity component of the frame image data most recently captured. As a result of the determination of the exposure conditions excluding the aperture value, the subsequent through-images are captured with the aperture value set at Step S9 in FIG. 3 and under the exposure conditions excluding the set aperture value. However, when the exposure conditions excluding the aperture value are determined again at Step S28, the through-image will be shot with the newly set exposure conditions excluding the aperture value and with the aperture value set at Step S9 in FIG. 3. In other words, while the AE re-processing command is continuously issued, aperture preferred exposure tracking is performed.

As a result, frame image data can be captured with an appropriate amount of exposure. Therefore, the accuracy of the judgments on whether or not an automatic shooting condition has been satisfied (judgments regarding automatic shooting timing), namely the accuracy of image analysis, can be improved. In cases where frame image data does not have an appropriate amount of exposure, the accuracy of the judgments on whether or not an automatic shooting condition has been satisfied will be reduced.

Figure 3:
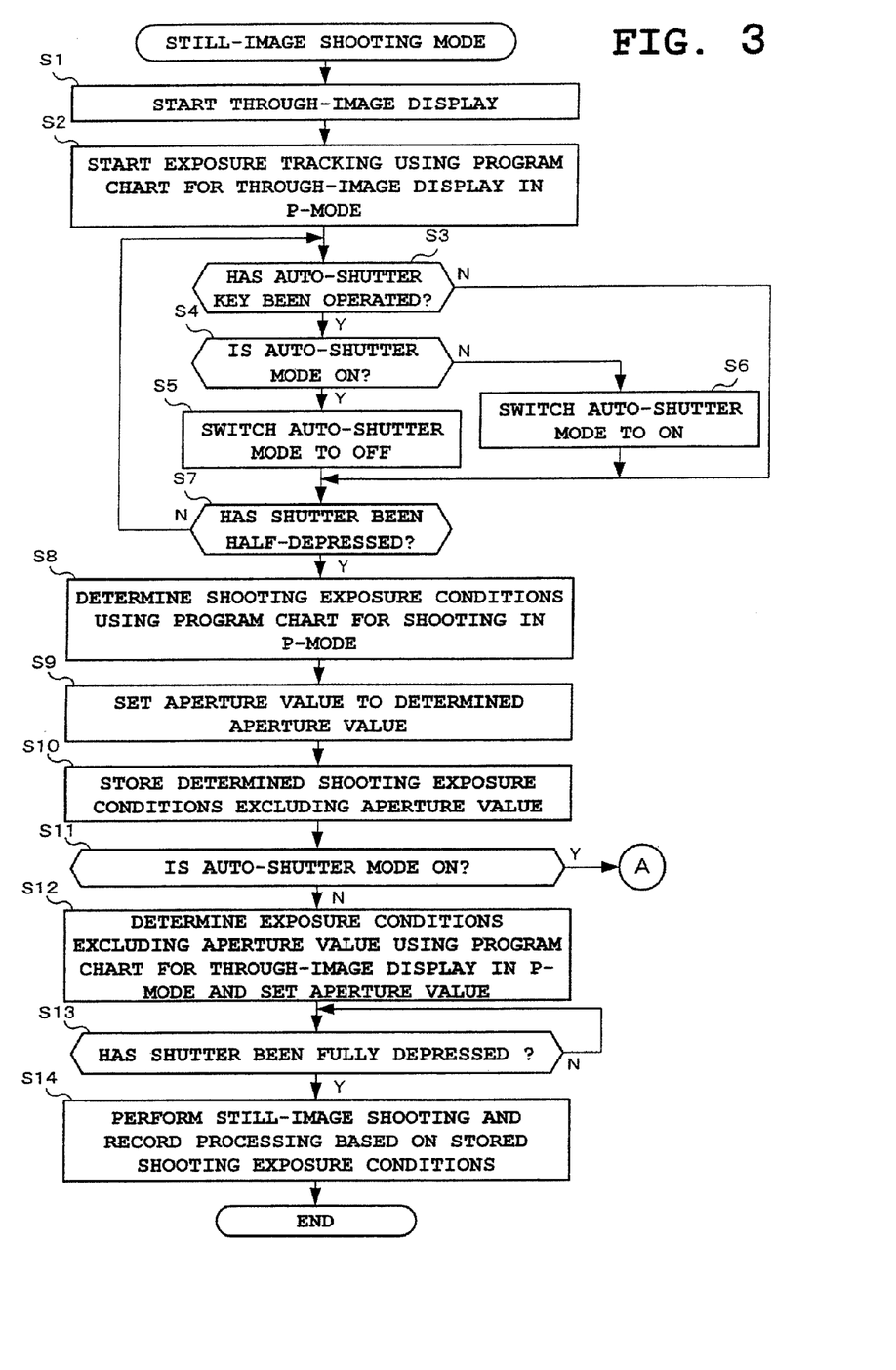
FIG. 3 is a flowchart showing an operation of the digital camera 1 according to the embodiment.

Next, the CPU 10 determines shooting exposure conditions excluding the aperture value using the program chart for shooting in A-mode, the current LV value, and the aperture value set at Step S9 in FIG. 3 (determines shooting exposure conditions in the aperture preferred mode), and after storing the determined shooting exposure conditions in the shooting exposure conditions storage area (Step S29), returns to Step S26. In other words, the CPU 10 updates the content of the shooting exposure condition storage area.

Then, when judged at Step S26 that an automatic shooting condition has been satisfied, the CPU 10 performs the still-image shooting process under the shooting exposure conditions excluding the aperture value currently stored in the shooting exposure condition storage area, without changing the aperture value set at Step S9 in FIG. 3 (without operating the aperture 4). The obtained still-image data is compressed and recorded in the flash memory 14 (Step S30). When judged at Step S27 that the AE re-processing command is not issued, and further judged at Step S26 that an automatic shooting condition has been satisfied, the CPU 10 performs the still-image shooting process under the shooting exposure conditions excluding the aperture value stored in the shooting exposure condition storage area at Step S10, without changing the aperture value set at Step S9 in FIG. 3 (without operating the aperture 4).

At this time, in cases where the strobe is illuminated, the light-emitting circuit of the strobe device 16 provides the xenon tube with the load of the internal capacitor C and emits a flash of light.

C. Effects

As described above, according to the embodiment, capturing is performed after an aperture value is fixed, and exposure conditions and shooting exposure conditions excluding the aperture value are determined. Therefore, image data with correct exposure can be obtained, while suppressing the shooting time lag.

Also, when the AE re-processing command is issued, the exposure tracking of a through-image in the aperture preferred mode is performed. Therefore, a through-image with correct exposure can be captured, while suppressing the shooting time lag.

Moreover, when the AE re-processing command is issued, shooting exposure conditions in the aperture preferred mode are determined. Therefore, automatic shooting can be performed with correct exposure, while suppressing the shooting time lag.

Furthermore, because the exposure tracking of a through-image in the aperture preferred mode is performed, the accuracy of the judgments on whether or not an automatic shooting condition has been satisfied, namely the accuracy of image analysis, can be improved. In particular, because the exposure tracking of a through-image in the aperture preferred mode is performed after the AE re-processing command is issued, the judgments on whether or not an automatic shooting condition has been satisfied can be accurately made.

[Modifications]

The following variation example of the embodiment as described above is possible.

Figure 4:
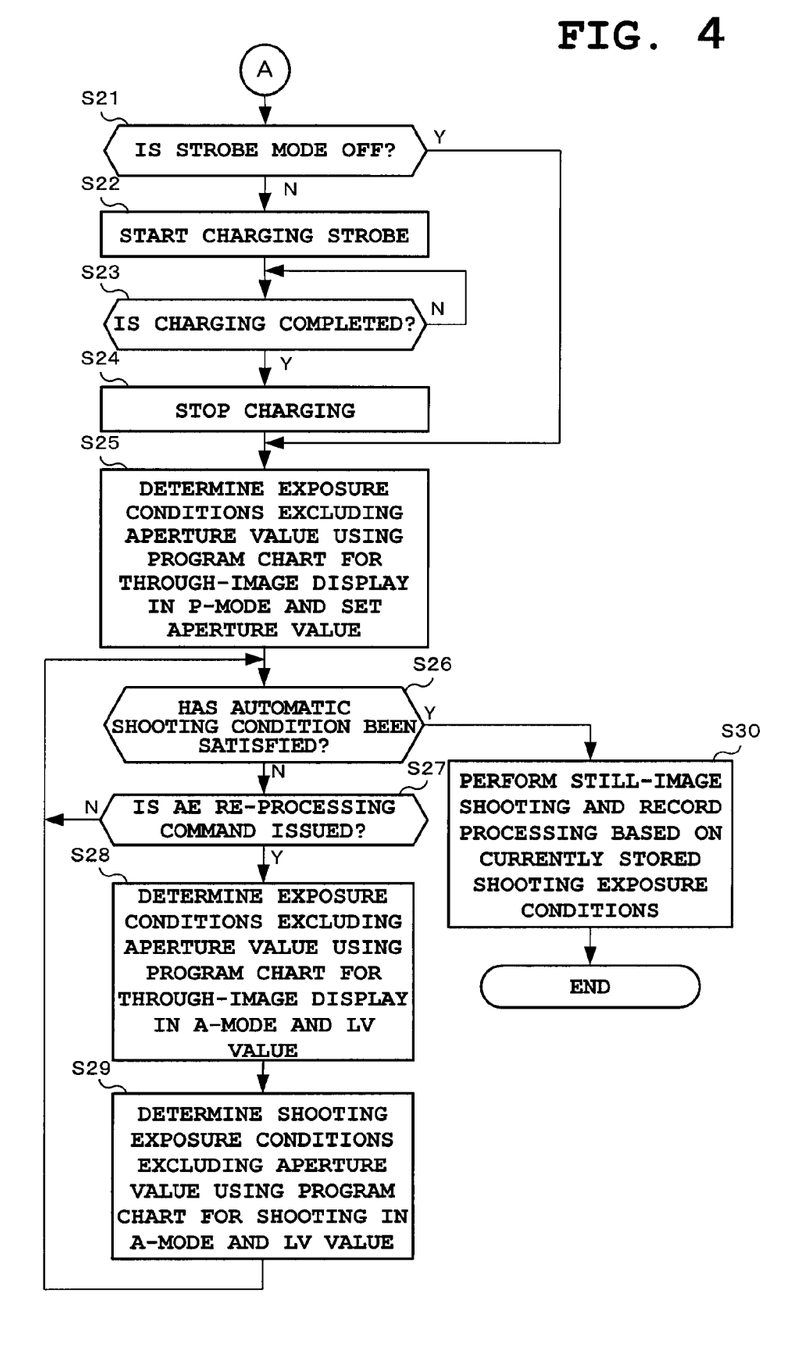
FIG. 4 is a flowchart showing an operation of the digital camera 1 according to the embodiment.

(01) According to the above-described embodiment, whether or not the AE re-processing command is issued at Step S27 in FIG. 4 is judged, and when on a condition where the command is continuously issued, the exposure tracking of a through-image in the aperture preferred mode is performed and the shooting exposure conditions in the aperture preferred mode are determined (Step S28 and Step S29). However, whether or not the LV value of the luminance of a subject is significantly changed (whether or not the LV value is changed by a predetermined value or more) may be judged at Step S27, and the operation at Step S29 may be performed when judged that the LV value is significantly changed at Step S28.

As a result, a through-image with correct exposure can be captured and obtained, while suppressing the shooting time lag.

(02) According to the above-described embodiment, while the AE re-processing command is issued, the exposure tracking of a through-image in the aperture preferred mode is performed (Step S28 in FIG. 4). However, exposure tracking including an ordinary aperture (exposure tracking using the program chart for through-image display in P-mode) may be performed instead. In other words, the aperture value, the shutter speed, the gain value, and the like may be determined using the most recently calculated LV value and the program chart for through-image display in P-mode, and the next frame image data may be captured under the determined exposure conditions. At this time, the aperture value is not fixed but variable. Then, in the operation performed at Step S29, the shooting exposure conditions excluding the aperture value of when the most recently determined aperture value is fixed are determined, and the storage area is updated. As a result, even when judged at Step S26 that an automatic shooting condition has been satisfied, automatic shooting can be performed without operating the aperture 4, and a through-image with correct exposure can be captured and obtained, while suppressing the shooting time lag.

(03) According to the above-described embodiment, while the AE re-processing command is issued, the digital camera 1 is in the aperture preferred mode. In other words, the aperture value is fixed and the exposure conditions and the shooting exposure conditions excluding the aperture value are determined (Step S28 and Step S29 in FIG. 4). However, the digital camera 1 may be set in the aperture preferred mode when the shutter is half-depressed, when the auto-shutter mode is ON, or when the digital camera 1 is set in the still-image shooting mode.

As a result, a through-image with correct exposure can be captured and obtained, while suppressing the shooting time lag.

(04) According to the above-described embodiment, when the AE re-processing command is issued, the exposure tracking of a through-image in the aperture preferred mode is performed (Step S28 in FIG. 4). However, the exposure tracking needs not be performed. In other words, when the result of the judgment at Step S27 in FIG. 4 is YES, the CPU 10 may proceed directly to Step S29.

(05) According to the above-described embodiment, when the AE re-processing command is issued, the exposure tracking of a through-image in the aperture preferred mode is performed. However, the exposure tracking of a through-image in the aperture preferred mode may be performed without the AE re-processing command being issued. In this case, when judged at Step S26 that an automatic shooting condition has not been satisfied, the CPU 10 performs the operation at Step S28 and proceeds to Step S27. Then, when the result of the judgment at Step S27 is YES, the CPU 10 proceeds directly to Step S29.

Alternatively, the exposure tracking of a through-image in the aperture preferred mode may be initiated even before the shutter button is half-depressed. In this case, exposure tracking is required to be performed after the aperture value is first determined based on the program chart for shooting in P-mode.

As a result, a through-image with correct exposure can be captured and obtained, while suppressing the shooting time lag.

(06) According to the above-described embodiment, the CPU 10 performs the operations at Step S8 and Step S9 in FIG. 3 at a timing at which the shutter button is half-depressed. However, in addition to (or instead of) this timing, the CPU 10 may set the aperture value by performing the operations at Step S8 and Step S9 in FIG. 3 at a timing at which the first AE re-processing command is issued, and proceed to Step S28. Here, the timing at which the first AE re-processing command is issued refers to a timing at which the AE re-processing command is issued on a condition where the AE re-processing command has not been issued. Therefore, the timing also includes a timing at which the first AE re-processing command is issued after the AE re-processing command is continuously issued and subsequently stopped without the judgment that an automatic shooting condition has been satisfied. This is because, a condition where the AE re-processing command has been issued is not necessarily a condition where an automatic shooting condition has been satisfied.

(07) According to the above-described embodiment, when suddenly judged that an automatic shooting condition has been satisfied without the AE re-processing command being issued, still-image shooting is performed under shooting exposure conditions excluding the aperture value stored at Step S10, without changing the aperture value set at Step S9 in FIG. 3 (without operating the aperture 4). However, when suddenly judged that an automatic shooting condition has been satisfied without the AE re-processing command being issued, the CPU 10 may perform the operation at Step S29 in FIG. 4 and perform still-image shooting under shooting exposure conditions excluding the aperture value stored and updated by the operation at Step S29, without changing the aperture value set at Step S9 in FIG. 3.

As a result, a through-image with correct exposure can be captured and obtained, while suppressing the shooting time lag.

(08) According to the above-described embodiment, when judged that an automatic shooting condition has been satisfied and if the AE re-processing command is issued, the CPU 10 determines the shooting exposure conditions in the aperture preferred mode at Step S29 in FIG. 4. However, the CPU 10 may redetermine the shooting exposure condition in the aperture preferred mode when judged that an automatic shooting condition has been satisfied. Also, the CPU 10 may determine the shooting exposure conditions in the aperture preferred mode for the first time when judged that an automatic shooting condition has been satisfied. In other words, when judged at Step S26 in FIG. 4 that an automatic shooting condition has not been satisfied, the CPU 10 may remain at Step S26 until judged that an automatic shooting condition has been satisfied. Then, when judged that an automatic shooting condition has been satisfied, the CPU 10 may perform the operation at Step S29 and still-image shooting under shooting exposure conditions excluding the aperture value stored and updated by the operation at Step S29, without changing the aperture value set at Step S9 in FIG. 3.

At this time, the CPU 10 may perform the exposure tracking operation (operation at Step S28 in FIG. 4) of a through-image in the aperture preferred mode until judged that an automatic shooting condition has been satisfied.

Furthermore, by judging whether or not an automatic shooting condition is a follow shot, whether or not to reset shooting exposure conditions after judged that an automatic shooting condition has been satisfied may be changed. Thereby, correct exposure can be obtained even when the variation speed of a photographing field angle is high or the variability region of a photographing field angle is wide as in a follow shot.

As a result, a through-image with correct exposure can be captured and obtained, while suppressing the shooting time lag.

(09) According to the above-described embodiment, when judged at Step S26 in FIG. 4 that an automatic shooting condition has been satisfied, the CPU 10 proceeds to Step S30 and performs still-image shooting processing based on shooting exposure conditions excluding the aperture value currently stored in the shooting exposure condition storage area, without changing the aperture value set at Step S9 in FIG. 3 (without operating the aperture 4). The CPU 10 then compresses the obtained still-image data and records the compressed image data in the flash memory 14. However, when judged at Step S26 in FIG. 4 that an automatic shooting condition has been satisfied, the CPU 10 may compress the most recently captured frame image data (through-image) as a still-image and record the compressed image data in the flash memory 14. In this case, the operation at Step S29 is not required to be performed. In other words, the CPU 10 returns directly to Step S26 after performing the operation at Step S28.

In this case also, exposure tracking in the aperture preferred mode is performed at Step S28 in FIG. 4. In other words, a through-image having a fixed aperture value and an appropriate amount of exposure is captured. As a result, image data with correct exposure can be obtained, while suppressing the shooting time lag.

(10) Furthermore, the above-described modifications (01) to (09) may be randomly combined.

(11) The individual embodiments of the present invention as described above are merely examples as a best mode for carrying out the invention, and aims to facilitate understanding of the principle and the structure of the present invention. It is not intended to limit the scope of the accompanying claims.

Therefore, it should be construed that various variations and modifications for the above-described embodiments of the present invention be included in the scope of the present invention and protected by the scope of the accompanying claim of the present invention.

Lastly, in the individual embodiments as described above, a case where an imaging apparatus of the present invention is applied to the digital camera 1 is described. However, the present invention is not limited to the above-described embodiments. In other words, the present invention may be applied to any apparatus as long as it can perform automatic recording.

Furthermore, although the processing program of the imaging apparatus which is a preferred embodiment of the present invention is stored in the memory (for example, ROM, etc.) of the imaging apparatus, this processing program is stored thereon a computer-readable medium and should also be protected in the case of manufacturing, selling, etc. of only the program. In that case, the method of protecting the program with a patent will be realized by the form of the computer-readable medium on which the processing program is stored.

While the present invention has been described with reference to the preferred embodiments, it is intended that the invention be not limited by any of the details of the description therein but includes all the embodiments which fall within the scope of the appended claims.

What is claimed is:
1. An imaging apparatus comprising:
an image sensor;

a first judging section which judges whether or not image data captured by the image sensor is in a state which satisfies a first condition;

a second judging section which judges whether or not the image data captured by the image sensor is in a state which satisfies a second condition that is more generous than the first condition, when the first condition is not satisfied;

an automatic shooting control section which successively judges whether or not the imaging apparatus is in a state which satisfies the first condition based on a result of judging by the first judging section, and automatically records the image data captured by the image sensor when it is judged that the imaging apparatus is in the state which satisfies the first condition; and an automatic exposure control section which performs an automatic exposure adjustment in an aperture preferred mode when, in response to successively judging whether or not the imaging apparatus is in a state which satisfies the second condition based on a result of judging by the second judging section, it is judged that the imaging apparatus is in the state which satisfies the second condition, following an automatic exposure adjustment in a mode which is not the aperture preferred mode.

2. The imaging apparatus according to claim 1, wherein the automatic exposure control section performs the automatic exposure adjustment in the aperture preferred mode between (i) initiating the first condition judgment by the automatic shooting control section following the automatic exposure adjustment in the mode which is not the aperture preferred mode and (ii) the judgment that the imaging apparatus is in the state which satisfies the first condition.

3. The imaging apparatus according to claim 1, wherein the automatic exposure control section performs the automatic exposure adjustment in the aperture preferred mode simultaneously with or directly after initiating the first condition judgment by the automatic shooting control section following the automatic exposure adjustment in the mode which is not the aperture preferred mode.

4. The imaging apparatus according to claim 1, wherein the automatic exposure adjustment in the mode which is not the aperture preferred mode changes both an aperture value and a shutter speed based on a luminance of a photographic subject; and wherein the automatic exposure adjustment in the aperture preferred mode changes the shutter speed based on the luminance of the photographic subject with the aperture value being fixed.

5. The imaging apparatus according to claim 4, wherein the automatic exposure adjustment in the aperture preferred mode changes the shutter speed based on the luminance of the photographic subject with the aperture value being fixed so as to constitute an aperture value set by the automatic exposure adjustment in the mode which is not the aperture preferred mode.

6. The imaging apparatus according to claim 1, wherein the automatic shooting control section judges whether or not the imaging apparatus is in the state which satisfies the first condition based on the image data captured by the image sensor.

7. The imaging apparatus according to claim 1, further comprising a control section which performs the automatic exposure adjustment in the aperture preferred mode after it is judged that the imaging apparatus is in the state which satisfies the first condition.

8. The imaging apparatus according to claim 1, further comprising a through-image display section which cyclically captures the photographic subject using the image sensor and which cyclically displays captured images, wherein the through-image display section performs the cyclical capturing using exposure tracking in the aperture preferred mode.

9. The imaging apparatus according to claim 1, wherein the automatic exposure control section determines an exposure condition by performing the automatic exposure adjustment in the aperture preferred mode based on the image data captured by the image sensor before it is judged that the imaging apparatus is in the state which satisfies the first condition; and wherein the automatic shooting control section records the image data captured by the image sensor with an exposure condition most recently determined by the automatic exposure control section when it is judged that the imaging apparatus is in the state which satisfies the first condition.

10. The imaging apparatus according to claim 1, wherein the automatic exposure control section judges whether or not there is a change in a luminance of a photographic subject based on the image data captured by the image sensor before it is judged that the imaging apparatus is in the state which satisfies the first condition, and determines an exposure condition by performing the automatic exposure adjustment in the aperture preferred mode when it is judged that there is a change in the luminance of the photographic subject; and wherein the automatic shooting control section records the image data captured by the image sensor with an exposure condition most recently determined by the automatic exposure control section when it is judged that the imaging apparatus is in the state which satisfies the first condition.

11. The imaging apparatus according to claim 1, wherein the automatic exposure control section determines an exposure condition by performing the automatic exposure adjustment in the aperture preferred mode based on the image data captured by the image sensor when it is judged that the imaging apparatus is in the state which satisfies the first condition, and wherein the automatic shooting control section records the image data captured by the image sensor with the exposure condition determined by the automatic exposure control section.

12. The imaging apparatus according to claim 1, further comprising an exposure condition storage section which stores an exposure condition determined by performing the automatic exposure adjustment in the mode which is not the aperture preferred mode, wherein the automatic shooting control section records image data captured by the image sensor by the exposure condition stored by the exposure condition storage section.

13. A controlling method for an imaging apparatus, the method comprising:

a first judging processing for judging whether or not image data captured by an image sensor is in a state which satisfies a first condition;

a second judging processing for judging whether or not the image data captured by the image sensor is in a state which satisfies a second condition that is more generous than the first condition, when the first condition is not satisfied;

an automatic shooting control processing for successively judging whether or not the imaging apparatus is in the state which satisfies the first condition by the first judging processing, and automatically recording the image data captured by the image sensor when it is judged that the imaging apparatus is in the state which satisfies the first condition; and an automatic exposure control processing for performing an automatic exposure adjustment in an aperture preferred mode when, in response to successively judging whether or not the imaging apparatus is in a state which satisfies the second condition by the second judging processing, it is judged that the imaging apparatus is in the state which satisfies the second condition, following an automatic exposure adjustment in a mode which is not the aperture preferred mode.

14. A non-transitory computer readable storage medium having a program stored thereon that is executable by a computer in an imaging apparatus to perform functions comprising:

a first judging processing for judging whether or not image data captured by an image sensor is in a state which satisfies a first condition;

a second judging processing for judging whether or not the image data captured by the image sensor is in a state which satisfies a second condition that is more generous than the first condition, when the first condition is not satisfied;

automatic shooting control processing for successively judging whether or not the imaging apparatus is in a state which satisfies the first condition by the first judging processing, and automatically recording the image data captured by the image sensor when it is judged that the imaging apparatus is in the state which satisfies the first condition; and automatic exposure control processing for performing an automatic exposure adjustment in an aperture preferred mode when, in response to successively judging whether or not the imaging apparatus is in a state which satisfies the second condition by the second judging processing, it is judged that the imaging apparatus is in the state which satisfies the second condition, following an automatic exposure adjustment in a mode which is not the aperture preferred mode.

\* \* \* \* \*